(12) United States Patent
Hall et al.

(10) Patent No.: US 10,539,661 B2
(45) Date of Patent: Jan. 21, 2020

(54) THREE DIMENSIONAL LIDAR SYSTEM WITH TARGETED FIELD OF VIEW

(71) Applicant: Velodyne Lidar, Inc., Morgan Hill, CA (US)

(72) Inventors: David S. Hall, Los Altos Hills, CA (US); Mathew Noel Rekow, Santa Cruz, CA (US); Stephen S. Nestinger, Santa Clara, CA (US); Pieter J. Kerstens, Gilroy, CA (US)

(73) Assignee: Velodyne Lidar, Inc., Morgan Hill, CA (US)

( * ) Notice: Subject to any disclaimer, the term of this patent is extended or adjusted under 35 U.S.C. 154(b) by 300 days.

(21) Appl. No.: 15/360,903

(22) Filed: Nov. 23, 2016

(65) Prior Publication Data

US 2017/0146640 A1 May 25, 2017

Related U.S. Application Data

(60) Provisional application No. 62/260,205, filed on Nov. 25, 2015.

(51) Int. Cl.
*G01S 7/48* (2006.01)
*G01S 7/481* (2006.01)
*G01S 17/06* (2006.01)

(52) U.S. Cl.
CPC .......... *G01S 7/4815* (2013.01); *G01S 7/4817* (2013.01); *G01S 7/4865* (2013.01); *G01S 17/06* (2013.01)

(58) Field of Classification Search
None
See application file for complete search history.

(56) References Cited

U.S. PATENT DOCUMENTS

| 7,969,558 | B2 | 6/2011 | Hall | |
|---|---|---|---|---|
| 8,675,181 | B2 | 3/2014 | Hall | |
| 8,767,190 | B2 | 7/2014 | Hall | |
| 9,063,549 | B1* | 6/2015 | Pennecot | G05D 1/0259 |
| 2011/0273906 | A1* | 11/2011 | Nichol | G02B 6/0076 |
| | | | | 362/607 |
| 2012/0262550 | A1* | 10/2012 | Bridges | G01C 15/002 |
| | | | | 348/46 |
| 2013/0088872 | A1* | 4/2013 | Ball | G01C 11/025 |
| | | | | 362/249.01 |

\* cited by examiner

*Primary Examiner* — Hovhannes Baghdasaryan
(74) *Attorney, Agent, or Firm* — Goodwin Procter LLP

(57) ABSTRACT

A plurality of beams of illumination light are emitted from a LIDAR device over a range of angles and scanned about an axis of rotation. The range of angles includes the axis of rotation. Intermediate electronics boards provide mechanical support and electrical connectivity between a rotating electronics board and various elements of a light emission and collection engine. One or more of the optical elements of the collection optics, the illumination optics, or both, is constructed from one or more materials that absorb light outside of a predetermined wavelength range. An overmolded lens is fixedly coupled to one or more of the light detecting elements to collect incoming light over a larger range of angles. A lens element is disposed in the light path between a light emitting element and the illumination optics to flatten the intensity distribution of light emitted from the light emitting element to reduce peak intensity.

22 Claims, 10 Drawing Sheets

THREE DIMENSIONAL LIDAR SYSTEM WITH TARGETED FIELD OF VIEW

CROSS REFERENCE TO RELATED APPLICATION

The present application for patent claims priority under 35 U.S.C. § 119 from U.S. provisional patent application Ser. No. 62/260,205, entitled "Three Dimensional LIDAR System With Targeted Field of View," filed Nov. 25, 2015, the subject matter of which is incorporated herein by reference in its entirety.

TECHNICAL FIELD

The described embodiments relate to three dimensional LIDAR systems.

BACKGROUND INFORMATION

LIDAR systems employ pulses of light to measure distance to an object based on the time of flight (TOF) of the pulsed of light. A pulse of light emitted from a light source of the LIDAR system interacts with a distal object. A portion of the light reflects from the object and returns to a detector of the LIDAR system. Based on the time elapsed between emission of the pulse of light and detection of the returned pulse of light, a distance is estimated.

In some examples, a pulsed laser emitter is employed to generated light pulses. The light pulses are focused through a lens or lens assembly. The time it takes for that pulse of light to return to a detector mounted near the emitter is measured. A distance is derived from the time measurement with high accuracy.

In some examples, multiple pulses are emitted in rapid succession, and the direction of those emissions is sequentially varied. In these examples, each distance measurement can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud.

In some examples, rotating mirrors are rotated at very fast speeds—in the thousands of RPMs. As stated above, this design inherently renders only a 2-D point cloud. However, a 3-D point cloud is often required. The other dimension is provided for in a number of ways. Most often, the entire instrument is actuated up and down and/or back and forth, often on a gimbal—a process known within the art as winking or nodding the sensor. Thus, a single beam lidar unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the main premise is a single laser emitter/detector combination, where the light path is somehow altered to achieve a broader field of view than a single sensor. The device is inherently limited to the number of pixels it can generate due to the limitation of how many pulses per second are possible from a single laser. Any alteration of the beam path, whether it is by mirror, prism, or actuation of the device, causes the point cloud to be less dense, but cover a broader area.

As noted above, 3-D point cloud systems exist in several configurations. However, in many applications it is necessary to see over a broad field of view. For example, in an autonomous vehicle application, the vertical field of view should extend above the horizon, in case the car enters a dip in the road, and should extend down as close as possible to see the ground in front of the vehicle. In addition, it is necessary to have a minimum of delay between the actions happening in the real world and the imaging of those actions. In some examples, it is desirable to provide a complete image update at least five times per second.

Improvements in field of view and the point cloud density of 3-D imaging systems are desired.

SUMMARY

Methods and systems for performing LIDAR measurements are presented herein. In one aspect, a plurality of beams of illumination light from a LIDAR device are emitted into a three dimensional environment over a range of angles. The range of angles includes the axis of rotation of a light emission and collection engine of the LIDAR device. The light emission and collection engine include a plurality of light emitting elements, light detecting elements, illumination optics and collection optics.

In a further aspect, the LIDAR device is configured to scan each of the plurality of beams of light about the axis of rotation. In this manner, each beam of light projected into the environment traces a cone shaped pattern.

In yet another aspect, the light emission and collection engine includes intermediate electronics boards that provide mechanical support and electrical connectivity between a rotating electronics board and various elements of the light emission and collection engine. The intermediate electronics boards are each coupled to the rotating electronics board such that the planar surface of each of the intermediate electronics boards is oriented perpendicular to the planar surface of the rotating electronics board.

In yet another aspect, one or more of the optical elements of the collection optics, the illumination optics, or both is constructed from one or more materials that absorb light outside of a predetermined wavelength range that includes the wavelengths of light emitted by each of the light emitting elements.

In yet another aspect, an overmolded lens is fixedly coupled to one or more of the light detecting elements. The overmolded lens protects the light detecting element and is shaped to collect incoming light over a larger range of angles than would be possible without the lens.

In yet another aspect, a lens element is disposed in the light path between a light emitting element and the illumination optics to flatten the intensity distribution of light emitted from the light emitting element. This reduces the peak intensity of light emitted from the LIDAR system.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the

DETAILED DESCRIPTION

Reference will now be made in detail to background examples and some embodiments of the invention, examples of which are illustrated in the accompanying drawings.

Figure 1:
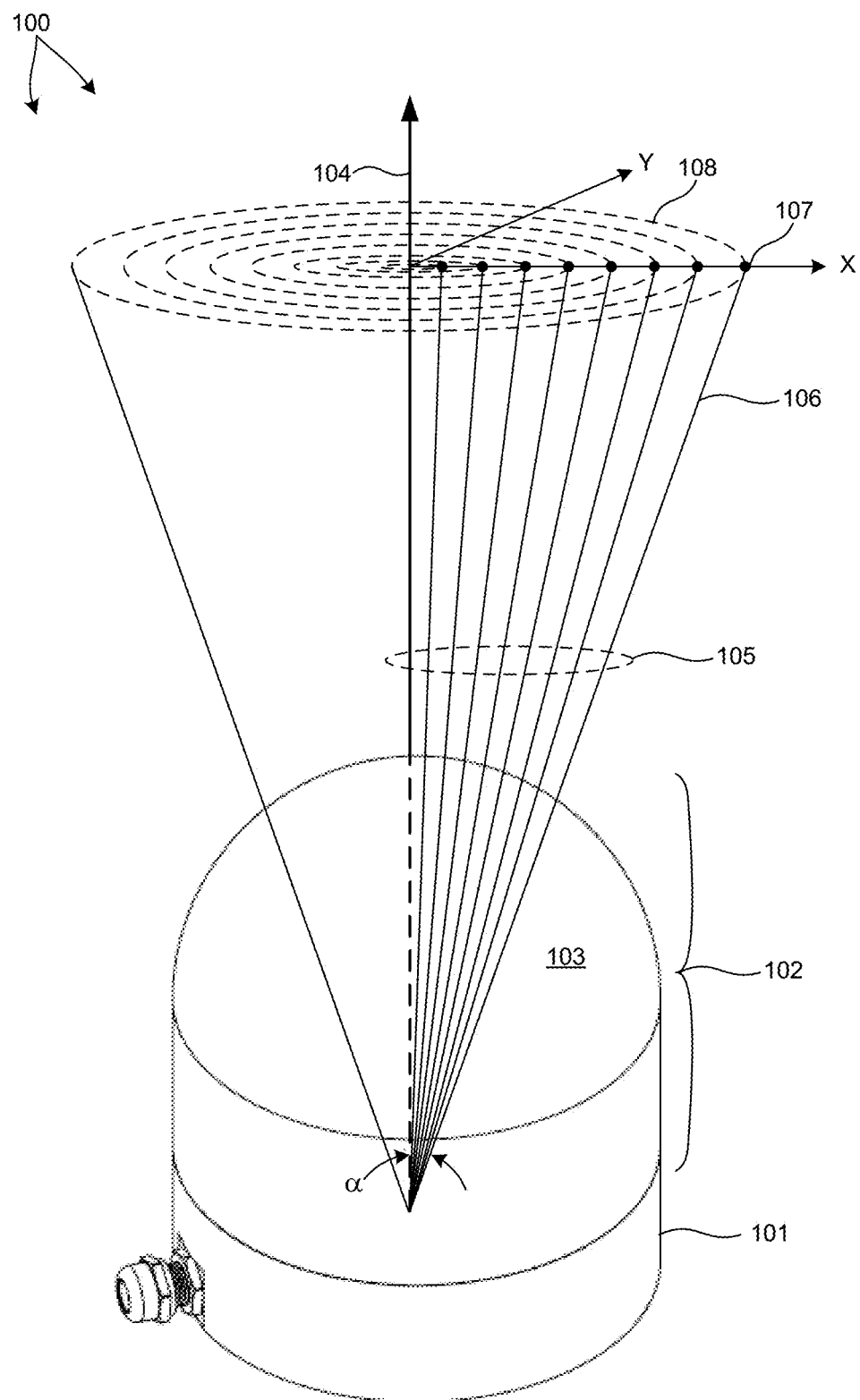
FIG. 1 is a simplified diagram illustrative of one embodiment of a 3-D LIDAR system 100 in at least one novel aspect.

FIG. 1 is a diagram illustrative of an embodiment of a 3-D LIDAR system 100 in one exemplary operational scenario. 3-D LIDAR system 100 includes a lower housing 101 and an upper housing 102. Lower housing 101 includes a frame structure configured to be attached to an object that is the reference from which LIDAR measurements are made (e.g., a vehicle, a tower, an aircraft, etc.). Upper housing 102 includes a domed shell element 103 constructed from a material that is transparent to infrared light (e.g., light having a wavelength within the spectral range of 700 to 1,700 nanometers). In one example, domed shell element 103 is transparent to light having a narrow range of wavelengths centered at 905 nanometers.

As depicted in FIG. 1, a plurality of beams of light 105 are emitted from 3-D LIDAR system 100 through domed shell element 103 over an angular range, α, measured from a central axis of rotation 104. In one aspect, the plurality of beams of light 105 spans the angular range from the central axis of rotation 104 to the angle, α, measured from central axis of rotation 104. In this sense, each beam of illumination light is emitted from the LIDAR device at a different angle with respect to the central axis of rotation, and one or more of the beams of light 105 are parallel to or nearly parallel to the central axis of rotation 104.

In the embodiment depicted in FIG. 1, each beam of light is projected onto a plane defined by the x and y axes at a plurality of different locations spaced apart from one another. For example, beam 106 is projected onto the xy plane at location 107. Thus, each beam of illumination light emitted from the light emission and collection engine illuminates a different spot of a three dimensional environment with a measurement pulse of illumination light.

In a further aspect, 3-D LIDAR system 100 is configured to scan each of the plurality of beams of light 105 about the central axis of rotation 104. In the embodiment depicted in FIG. 1, each beam of light projected onto the xy plane traces a circular pattern centered about the intersection point of the central axis of rotation 104 and the xy plane. For example, over time, beam 106 projected onto the xy plane traces out a circular trajectory 108 centered about central axis of rotation 104. The xy plane is depicted in FIG. 1 to illustrate the spatial separation of beams emitted from 3-D LIDAR system 100. In general, the beams emitted from 3-D LIDAR system 100 are projected into the surrounding environment and are incident on objects in the path of each respective beam.

Figure 2:
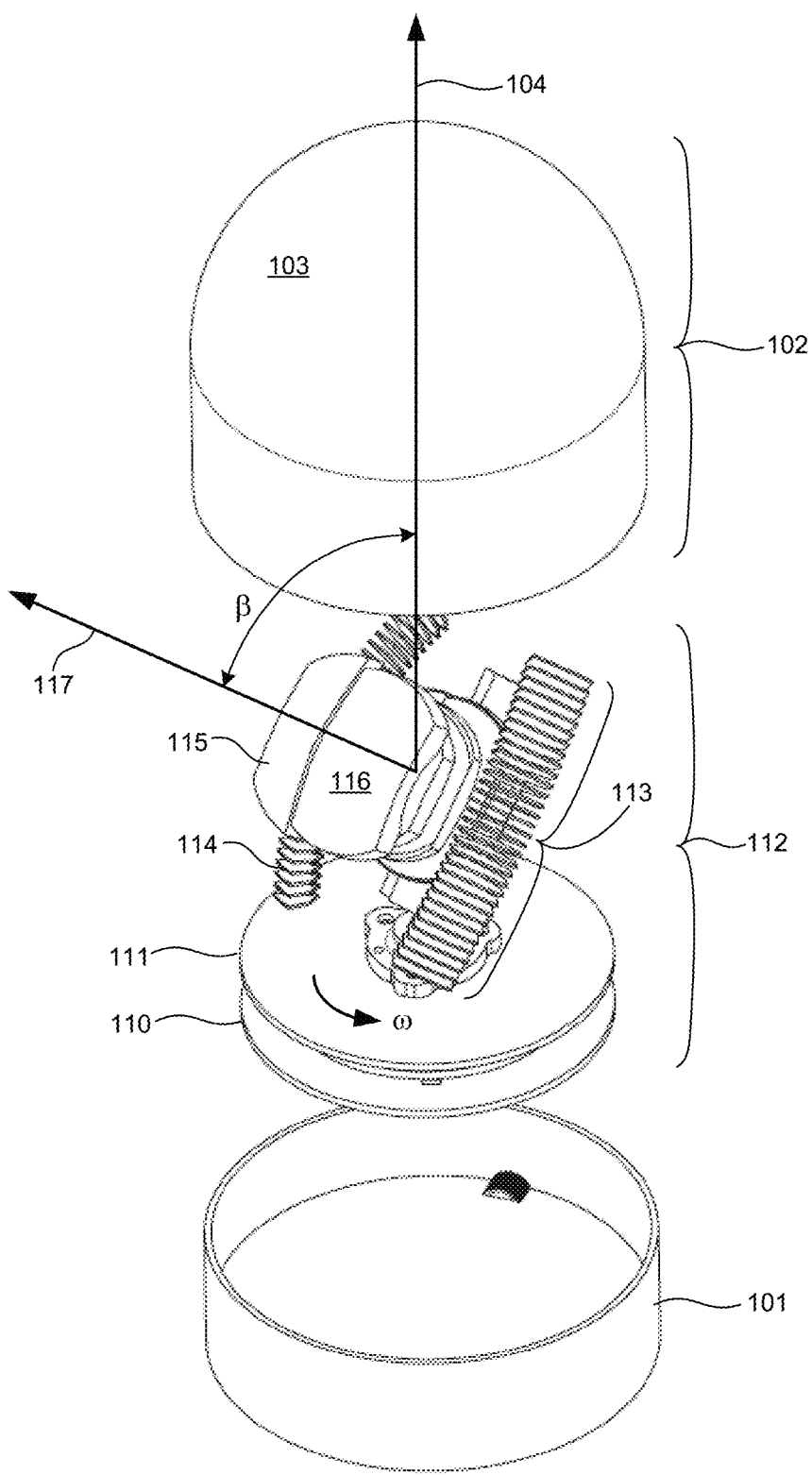
FIG. 2 depicts an exploded view of 3-D LIDAR system 100 in one exemplary embodiment.

FIG. 2 depicts an exploded view of 3-D LIDAR system 100 in one exemplary embodiment. 3-D LIDAR system 100 further includes a light emission and collection engine 112 that rotates about central axis of rotation 104. In another aspect, a central optical axis 117 of light emission and collection engine 112 (e.g., middle of angular range, α, of beams of illumination light 105 emitted from LIDAR device 100) is tilted at an angle, β, with respect to central axis of rotation 104. In general, angle, β, can be any angle between zero degrees and α/2.

As depicted in FIG. 2, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute), along with the light emission and collection engine 112. Electrical power signals and electronic signals are communicated between stationary electronics board 110 and rotating electronics board 111 over one or more transformer, capacitive or optical elements, resulting in a contactless transmission of these signals. Light emission and collection engine 112 is fixedly positioned with respect to the rotating electronics board 111, and thus rotates about central axis of rotation 104 at the predetermined angular velocity, ω. The planar surface of rotating electronics board 111 is oriented perpendicular to the central axis of rotation 104.

As depicted in FIG. 2, light emission and collection engine 112 includes an array of light emitting elements 114 and an array of light detecting elements 113. Light emitted from each of the light emitting elements 114 is directed toward a mirror (not shown). Light reflected from the mirror passes through a series of illumination optics 115 that approximately collimate the emitted light into an array of beams of illumination light 105 that are emitted from 3-D LIDAR system 100 as depicted in FIG. 1.

In general, any number of light emitting elements can be arranged to simultaneously emit any number of light beams from 3-D LIDAR system 100. In addition, any number of light emitting elements can be arranged to sequentially emit any number of light beams from 3-D LIDAR system 100. In one embodiment, two or more light emitting elements are triggered to emit light substantially simultaneously, and then after a programmed period of time has elapsed, another two or more light emitting elements are triggered to emit light substantially simultaneously.

Light reflected from objects in the environment is collected by collection optics 116. Collected light passes through collection optics 116 where it is focused onto each detecting element of the array of detecting elements 113. Nominally, each light detecting element corresponds to a different light emitting element. After passing through collection optics 116, the collected light is reflected from a mirror (not shown) onto each detector element. In practice, crosstalk among each measurement channel limits the number of channels that can be triggered simultaneously. However, to maximize imaging resolution, it is desirable to trigger as many channels as possible, simultaneously, so that time of flight measurements are obtained from many channels at the same time, rather than sequentially.

Figure 3:
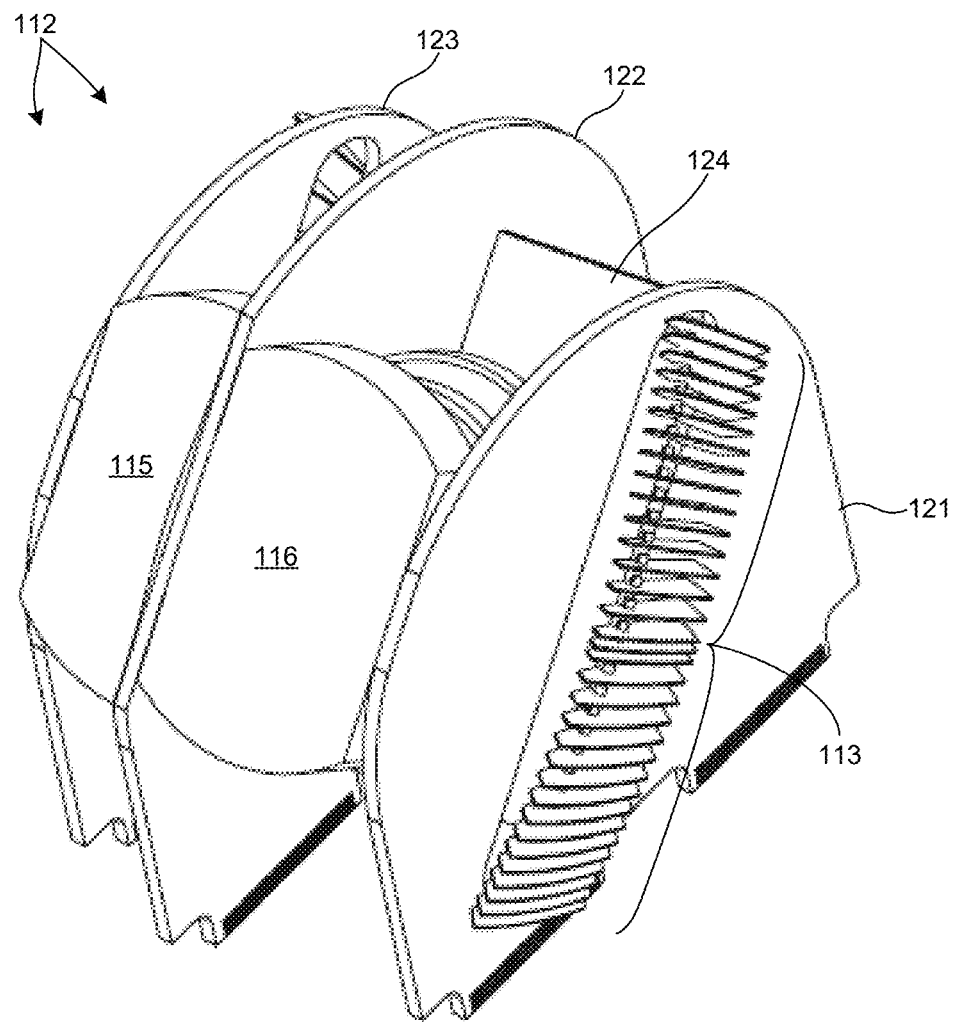
FIG. 3 depicts a view of light emission and collection engine 112 of 3-D LIDAR system 100.

FIG. 3 depicts another view of light emission and collection engine 112. In yet another aspect, light emission and collection engine 112 includes intermediate electronics boards 121, 122, and 123 which provide mechanical support and electrical connectivity between rotating electronics board 111 and various elements of light emission and collection engine 112. For example, each of the array of light detecting elements 113 is mounted to intermediate electronics board 121. Intermediate electronics board 121, in turn, is mechanically and electrically coupled to rotating electronics board 111. Similarly, each of the array of light emitting elements 114 is mounted to intermediate electronics board 123. Intermediate electronics board 123, in turn, is mechanically and electrically coupled to rotating electronics board 111. In another example, illumination optics 115 and collection optics 116 are mechanically mounted to intermediate electronics board 122. In this example, intermediate electronics board 122 spatially separates and optically obscures the illumination optics 115 from the collection optics 116 to avoid contamination of the collected light with illumination light. Intermediate electronics board 122, in turn, is mechanically and electrically coupled to rotating electronics board 111. In this manner, the intermediate electronics boards provide mechanical and electrical connectivity and additional board area for mounting electrical components required for the operation of 3-D LIDAR system 100. The intermediate electronics boards are each coupled to the rotating electronics board 111 such that the planar surface of each of the intermediate electronics boards is oriented perpendicular to the planar surface of the rotating electronics board.

Figure 4:
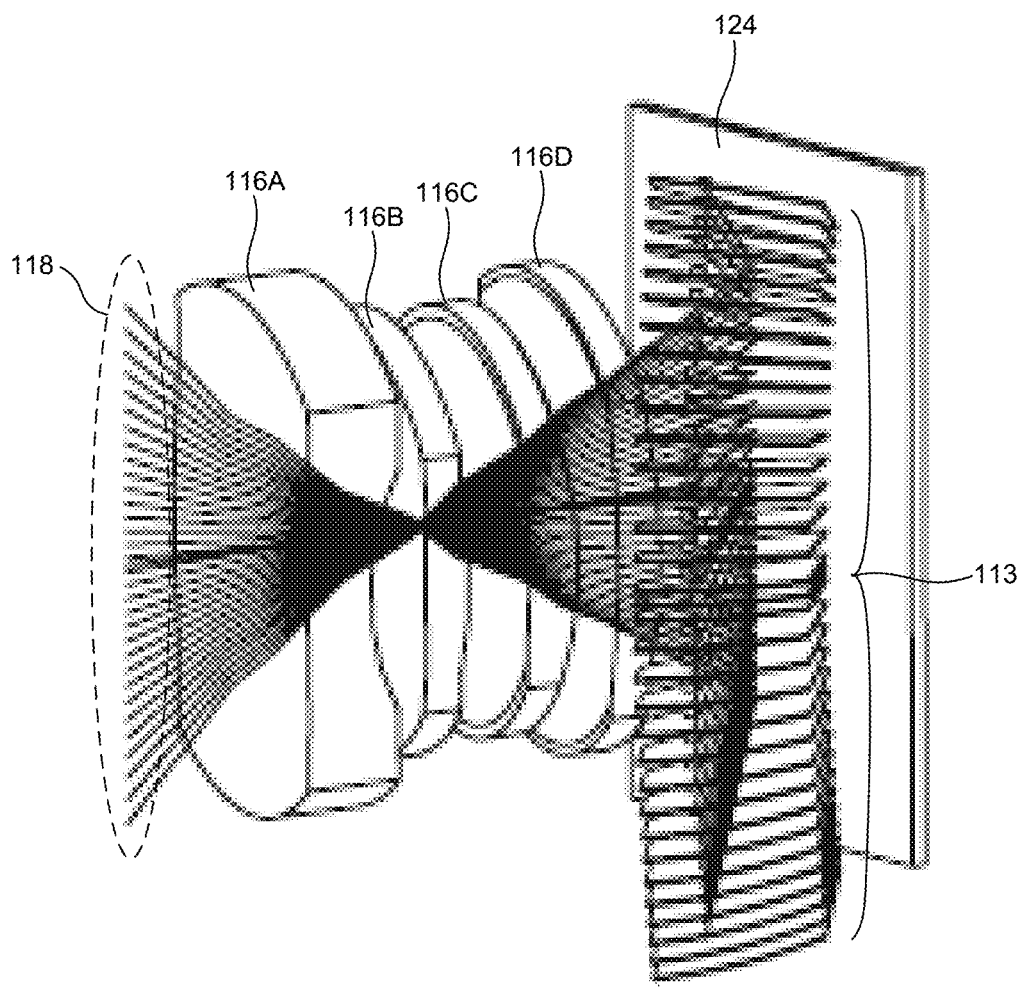
FIG. 4 depicts a view of collection optics 116 of 3-D LIDAR system 100 in greater detail.

FIG. 4 depicts a view of collection optics 116 in greater detail. As depicted in FIG. 4, collection optics 116 include four lens elements 116A-D arranged to focus collected light 118 onto each of the array of detecting elements 113. Light passing through collection optics 116 is reflected from mirror 124 and is directed onto each of the array of detecting elements 113.

In another aspect, one or more of the optical elements of collection optics 116 is constructed from one or more materials that absorb light outside of a predetermined wavelength range that includes the wavelengths of light emitted by each of the array of light emitting elements 114. In one example, one or more of the lens elements are constructed from a plastic material that includes a colorant additive to absorb at least fifty percent of light having wavelengths less than infrared light generated by each of the array of light emitting elements 114. In another example, the plastic material absorbs at least ninety percent of light having wavelengths less than the infrared light generated by each of the array of light emitting elements 114. In one example, the colorant is Epolight 7276A available from Aako BV (The Netherlands). In general, any number of different colorants can be added to any of the plastic lens elements of collection optics 116 to filter out undesired spectra.

Figure 5:
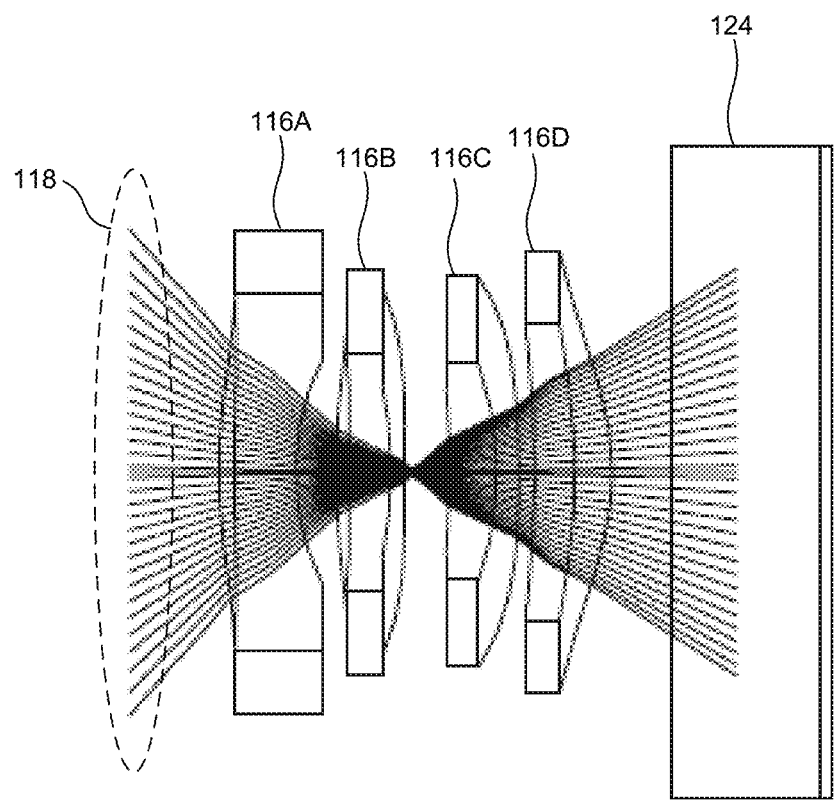
FIG. 5 depicts a cutaway view of collection optics 116 of 3-D LIDAR system 100 that illustrates the shaping of each beam of collected light 118.

FIG. 5 depicts a cutaway view of collection optics 116 to illustrate the shaping of each beam of collected light 118.

As described hereinbefore, one or more of the optical elements of collection optics 116 is constructed from one or more materials that absorb light outside of a predetermined wavelength range that includes the wavelengths of light emitted by each of the array of light emitting elements 114. However, in general, one or more of the optical elements of illumination optics 115 may also be constructed from one or more materials that absorb light outside of a predetermined wavelength range that includes the wavelengths of light emitted by each of the array of light emitting elements 114.

Figure 6:
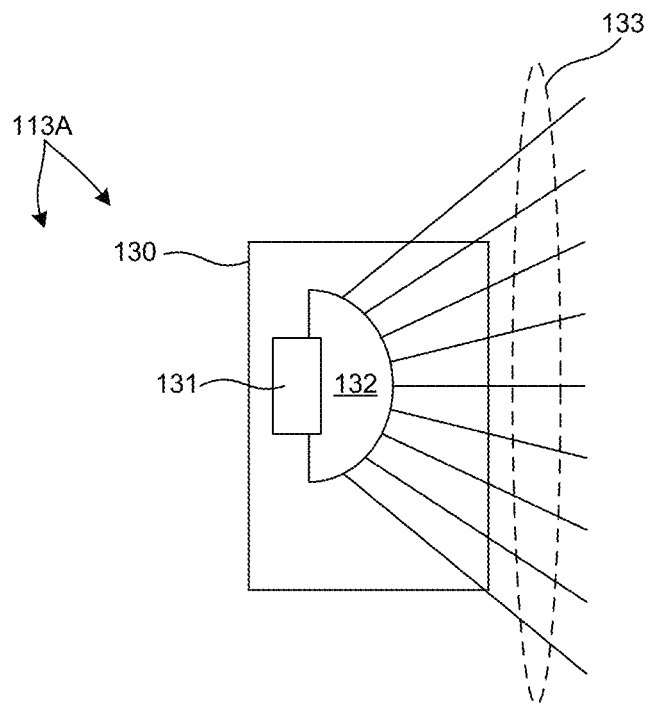
FIG. 6 depicts an illustration of one exemplary embodiment of an individual element 113A of the array of light detecting elements 113 depicted in FIG. 2.

FIG. 6 depicts an illustration of one exemplary embodiment of an individual element 113A of the array of light detecting elements 113 depicted in FIG. 2. Detecting element 113A includes an electronics board 130 upon which a light detecting element 131 is mounted. In some embodiments, light detecting element 131 is an avalanche photodiode (APD) element. However, in general, any suitable light detecting element may be employed.

In yet another aspect, an overmolded lens 132 is fixedly coupled to the light detecting element. The overmolded, lens protects the light detecting element and is shaped to collect incoming light over a larger range of angles than would be possible without the lens. In some examples, overmolded lens 132 is a domed lens. In some other examples, overmolded lens 132 is shaped as a compound parabolic concentrator (CPC).

Figure 7:
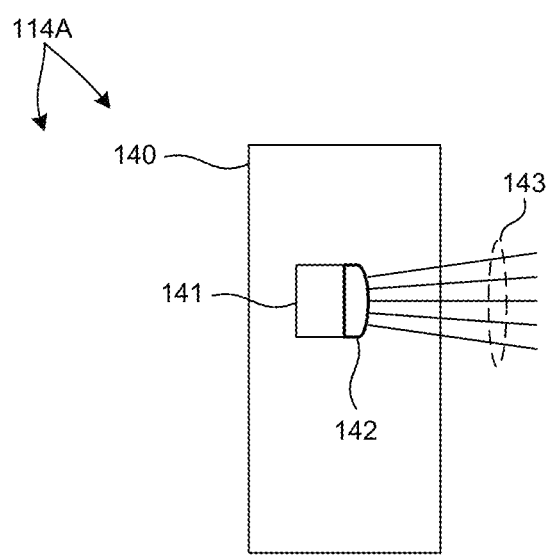
FIG. 7 depicts an illustration of one exemplary embodiment of an individual element 114A of the array of light emitting elements 114 depicted in FIG. 2.

FIG. 7 depicts an illustration of one exemplary embodiment of an individual element 114A of the array of light emitting elements 114 depicted in FIG. 2. Emitting element 114A includes an electronics board 140 upon which a light emitting element 141 is mounted. In some embodiments, light emitting element 141 is a diode laser element. However, in general, any suitable light source may be employed.

In yet another aspect, a lens element is disposed in the light path between light emitting element 141 and illumination optics 114 to flatten the intensity distribution of light emitted from light emitting element 141. In general, a laser diode based light emitting element emits light having a Gaussian intensity distribution. However, 3-D LIDAR system 100 is typically operated in an unstructured environment that includes humans with limited tolerance for infrared light intensity before eye damage may result. To ensure that the emission intensity of 3-D LIDAR system 100 remains below acceptable limits without attenuating the amount of total photonic flux, lens element 142 flattens the Gaussian distribution and thus reduces the peak intensity of light emitted from 3-D LIDAR system 100. In some examples, lens element 142 is a diffractive optical element configured to transform a Gaussian distribution to a flat-top distribution. However, in general, any optical element configured to flatten the Gaussian distribution may be contemplated.

The light emitting elements of 3-D LIDAR system 100 are pulse illumination sources, each emitting a pulsed beam of illumination light from the LIDAR device into the surrounding environment. In some embodiments, the light emitting elements are laser based. In some embodiments, the light emitting elements are based on one or more light emitting diodes. In general, any suitable pulsed illumination source may be contemplated.

Each measurement beam illuminates a particular location of the three dimensional environment (e.g., pixel) with a measurement pulse of illumination light. Each measurement pulse interrogates one location in the surrounding environment and results in an estimate of distance between the 3-D LIDAR system and the location. Light reflected from the location is detected by a corresponding light detecting element of the LIDAR system during a measurement window. The light detecting element detects the measurement pulse reflected from a particular location in the surrounding three dimensional environment. In this manner, the reflection from a particular measurement location of each measurement pulse is captured by the LIDAR system.

In a further aspect, the LIDAR system determines the time of flight of the measurement pulse from the LIDAR device to the particular illuminated spot of the three dimensional environment and back to the LIDAR device. The time of flight is determined based on the reflected light detected during the measurement window. The distance between the LIDAR device and the particular location of the three dimensional environment illuminated by the measurement pulse is determined based on the time of flight and the known speed of light.

Figure 8:
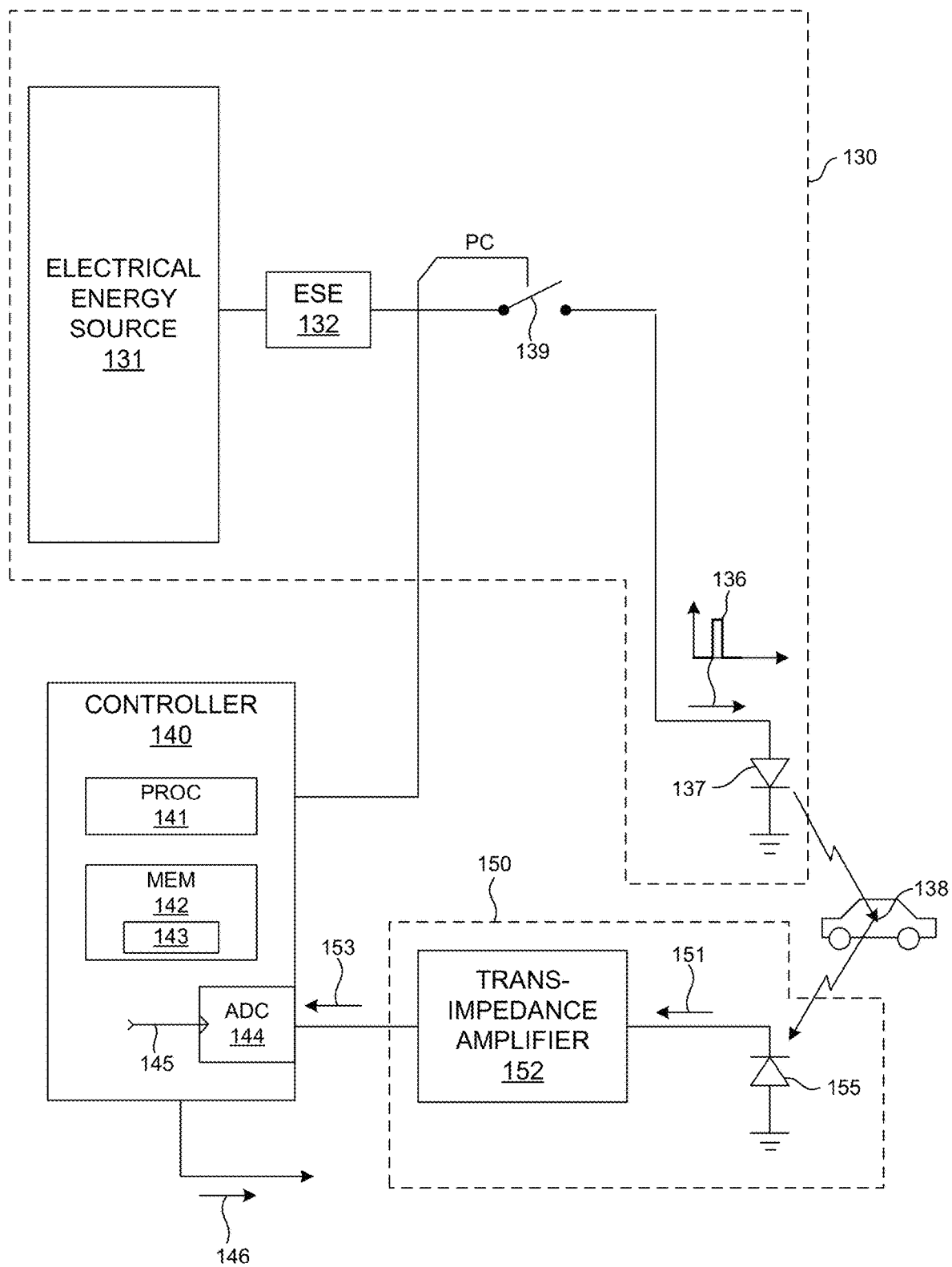
FIG. 8 depicts elements of a 3-D LIDAR system including a pulse illumination system 130, a light detection system 150, and controller 140.

FIG. 8 depicts elements of a LIDAR system including a pulse illumination system 130, a pulse light detection system 150, and controller 140 in one embodiment. The embodiment depicted in FIG. 8 is provided by way of non-limiting example, and many other suitable embodiments for performing pulse LIDAR measurements as described herein may be contemplated within the scope of this patent document.

Pulse illumination system 130 includes a pulsed light emitting element 137. Pulsed light emitting element 137 generates pulsed light emission in response to a pulsed electrical signal 136 provided to the pulsed light emitting element. The light generated by pulsed light emitting element 137 is focused and projected onto a particular location 138 in the surrounding environment by one or more optical elements of the LIDAR system. In one example, light emitted by pulsed light emitting element 137 is focused and projected onto a particular location by illumination optics 115 that collimate the emitted light into a pulsed beam of light 106 emitted from 3-D LIDAR system 100 as depicted in FIG. 1.

Pulse illumination system 130 includes one or more electrical energy storage elements (ESE) selectively coupled to the pulsed light emitting element 137. For illustration purposes, FIG. 8 depicts one energy storage element (labeled ESE 132), however, in general any number of energy storage elements may be employed to generate the a pulse of illumination light. In some examples, each energy storage element is a capacitor. An electrical energy source 131 (e.g., a voltage source) is electrically coupled to each of the energy storage elements and provides electrical energy to each of electrical energy storage elements. Each of the electrical energy storage elements is selectively coupled to the pulsed light emitting device 137 by a switching element. Again, for illustration purposes, FIG. 8 depicts one switching element (labeled 139). Each switching element is configured to toggle between two states depending on the state of a control signal (e.g., digital control signal, PC). In a first state, a switching element is substantially non-conductive. In this state, a corresponding energy storage element is effectively disconnected from the pulsed light emitting element 137. In this state, electrical energy flows from the electrical energy source 131 to each corresponding energy storage element to effectively charge the energy storage element. In a second state, the switching element is substantially conductive. In this state, the corresponding energy storage element is electrically coupled to the pulsed light emitting element 137. In this state, electrical energy flows from the energy storage element to the pulsed light emitting element 137.

As depicted in FIG. 8, any electrical current simultaneously supplied to the pulsed light emitting element 137 by any of the energy storage elements is effectively additive. In this manner, the electrical current signal 136 provided to the pulsed light emitting element 137 is effectively shaped by control signal, PC. For example, when PC controls switching element 139 to toggle from a substantially non-conductive state to a substantially conductive state, a pulse of electrical current 136 is provided to pulsed light emitting device 137. Similarly, pulses of electrical current can be provided to pulsed light emitting device 137 from other energy storage elements at the same time.

As depicted in FIG. 8, controller 140 generates control signal, PC, which controls the timing of electrical current pulses provided to pulsed light emitting element 137, and thus, the timing of pulses of light emitted from the LIDAR device.

In general, each pulse commanded by controller 140 can vary in magnitude and duration. Furthermore, the delay between pulses can also be varied.

In general, a pulse illumination system 130 may include any number of electrical energy storage elements selectively coupled to a pulsed light emitting element. Furthermore, one or more of the electrical energy storage elements may have an energy storage capacity that differs from one or more of the other electrical energy storage elements.

Figure 10:
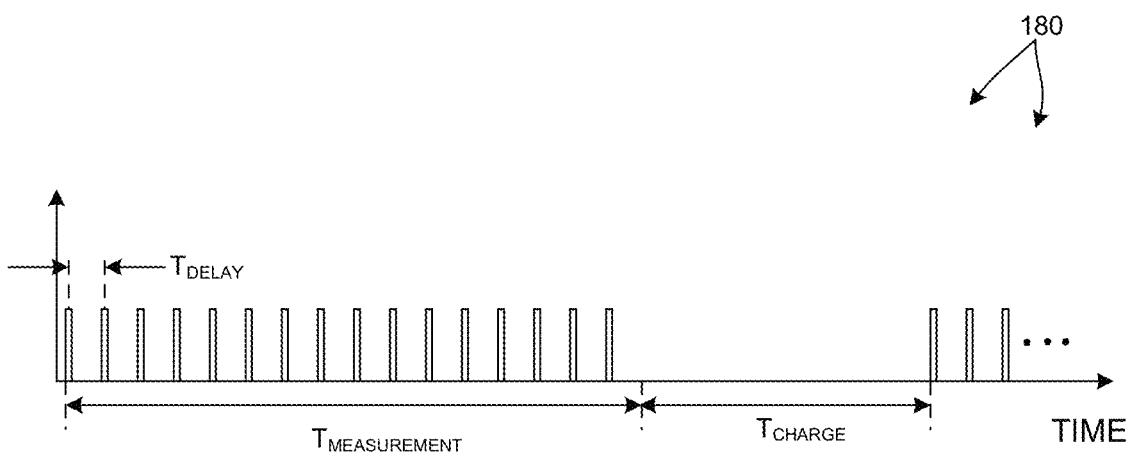
FIG. 10 depicts an illustration of the timing of light emission from sixteen pulse illumination sub-systems.

In a further embodiment, a LIDAR system, such as LIDAR system 100 depicted in FIG. 1, includes sixteen pulse illumination systems operating in coordination with a common controller (e.g., controller 140). FIG. 10 depicts an exemplary diagram 180 illustrating the timing of light emission from each of the sixteen pulse illumination systems.

As depicted in FIG. 10, a measurement pulse is emitted from a first pulse illumination system. After a delay time, $T_{DELAY}$, a measurement pulse is emitted from a second pulse illumination system of the LIDAR device. In this manner a sequence of sixteen measurement pulses are emitted in different directions from the LIDAR device during a measurement period, $T_{MEASUREMENT}$. The energy storage elements of each of the sixteen pulse illumination systems are charged after the measurement period for a charging period, $T_{CHARGE}$. After, the charging period, another measurement pulse is emitted from each pulse illumination system over a subsequent measurement period.

In some embodiments, the delay time, $T_{DELAY}$, is set to be greater than the time of flight of the measurement pulse to and from an object located at the maximum range of the LIDAR device. In this manner, there is no cross-talk among any of the sixteen pulse illumination systems.

In some other embodiments, a measurement pulse may be emitted from one pulse illumination system before a measurement pulse emitted from another pulse illumination system has had time to return to the LIDAR device. In some of these embodiments, care is taken to ensure that there is sufficient spatial separation between the areas of the surrounding environment interrogated by each beam to avoid cross-talk.

As depicted in FIG. 8, light reflected from location 138 is detected by light detecting element 155. Light detecting element 155 generates an output signal 151 that is amplified by an analog trans-impedance amplifier 152. In general, the amplification of output signal 151 may include multiple, amplifier stages. In this sense, analog trans-impedance amplifier 152 is provided by way of non-limiting example, as many other analog signal amplification schemes may be contemplated within the scope of this patent document.

The amplified signal 153 is communicated to controller 140. An analog-to-digital converter (ADC) 144 of controller 140 is employed to convert the analog signal 153 into a digital signal used for further processing. Controller 140 generates an enable/disable signal 145 employed to control the timing of data acquisition by ADC 144 in concert with pulse control signal, PC.

Figure 9:
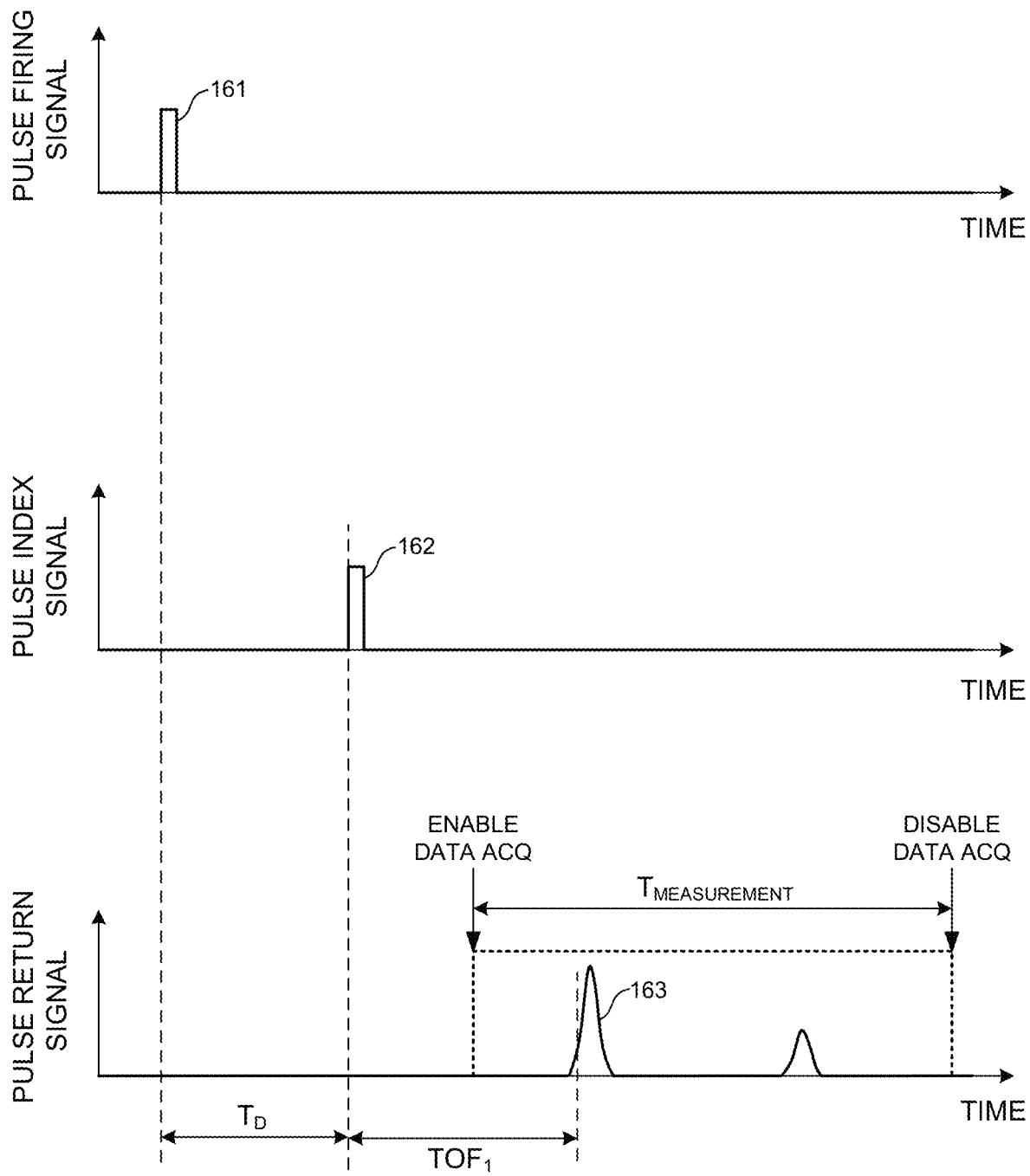
FIG. 9 depicts an illustration of the timing of emission of a pulse measurement beam and capture of the returning measurement pulse.

FIG. 9 depicts an illustration of the timing associated with the emission of a measurement pulse and capture of the returning measurement pulse. As depicted in FIG. 9, the measurement begins with a pulse firing signal 161 (e.g., PC) generated by controller 140. Due to internal system delay, an index signal 162 is determined that is shifted from the pulse firing signal 161 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.). The index signal is generated as a way to measure time delay within the system. As such, the index signal may be regenerated at any suitable time during system operation. In addition, an index signal may be employed to estimate time delay associated with one or more measurement channels.

As depicted in FIG. 9, a return signal 163 is detected by the LIDAR system in response to the illumination of a particular location. A measurement window (i.e., a period of time over which collected return signal data is associated with a particular measurement pulse) is initiated by enabling data acquisition from light detecting element 150. Controller 140 controls the timing of the measurement window to correspond with the window of time when a return signal is expected in response to the emission of a measurement pulse. In some examples, the measurement window is enabled at the point in time when the measurement pulse is emitted and is disabled at a time corresponding to the time of flight of light over a distance that is twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 9, return signal 163 includes two return measurement pulses that correspond with the emitted measurement pulse. In general, signal detection is performed on all detected measurement pulses. Further signal analysis may be performed to identify the closest signal (e.g., first instance of the return measurement pulse), the strongest signal, and the furthest signal (e.g., last instance of the return measurement pulse in the measurement window). Any of these instances may be reported as potentially valid distance measurements by the LIDAR system. For example, a time of flight, $TOF_1$, may be calculated from the closest (i.e., earliest) return measurement pulse that corresponds with the emitted measurement pulse as depicted in FIG. 9.

Figure 11:
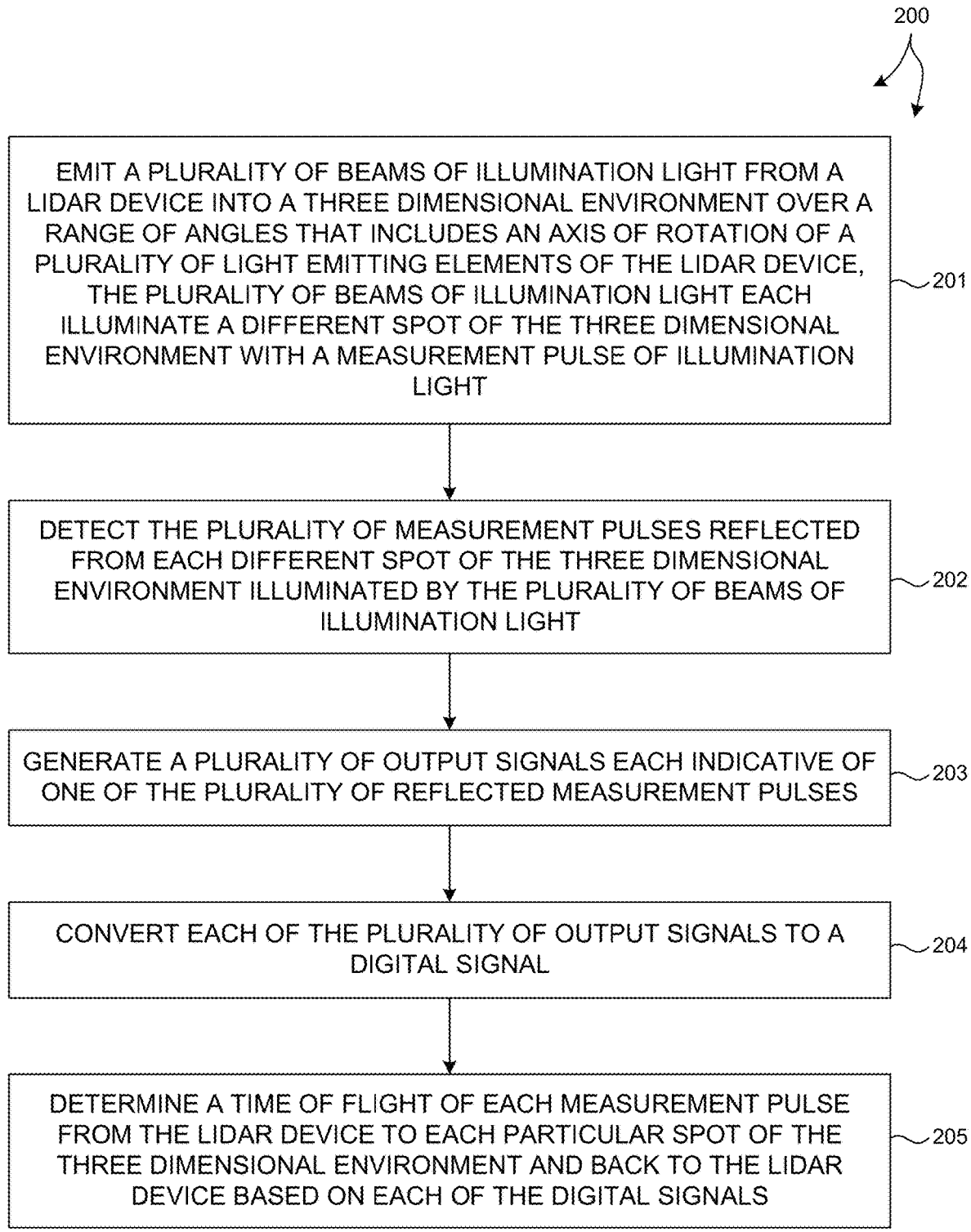
FIG. 11 depicts a flowchart illustrative of a method 200 of performing LIDAR measurements in at least one novel aspect.

FIG. 11 illustrates a method 200 of performing LIDAR measurements in at least one novel aspect. Method 200 is suitable for implementation by a LIDAR system such as LIDAR system 100 illustrated in FIG. 1 of the present invention. In one aspect, it is recognized that data processing blocks of method 200 may be carried out via a pre-programmed algorithm executed by one or more processors of controller 140, or any other general purpose computing system. It is recognized herein that the particular structural aspects of LIDAR system 100 do not represent limitations and should be interpreted as illustrative only.

In block 201, a plurality of beams of illumination light are emitted from a LIDAR device into a three dimensional environment over a range of angles that includes an axis of rotation of a plurality of light emitting elements of the LIDAR device. The plurality of beams of illumination light each illuminate a different spot of the three dimensional environment with a measurement pulse of illumination light.

In block 202, the plurality of measurement pulses reflected from each different spot of the three dimensional environment illuminated by the plurality of beams of illumination light are detected.

In block 203, a plurality of output signals are generated; each indicative of one of the plurality of reflected measurement pulses.

In block 204, each of the plurality of output signals are converted to a digital signal.

In block 205, a time of flight of each measurement pulse from the LIDAR device to each particular spot of the three dimensional environment and back to the LIDAR device is determined based on each of the digital signals.

In one or more exemplary embodiments, the functions described may be implemented in hardware, software, firmware, or any combination thereof. If implemented in software, the functions may be stored on or transmitted over as one or more in or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device, comprising:
   a rotating board arranged perpendicular to an axis of rotation;

a light emission and collection engine coupled to the rotating board to rotate about the axis of rotation, the light emission and collection engine including:

two or more electronics boards each oriented perpendicular to the rotating board a plurality of light emitting elements mounted to a first of the two or more electronics boards and configured to rotate about the axis of rotation, each configured to emit a beam of illumination light from the LIDAR device at a different angle with respect to the axis of rotation, wherein at least one of the plurality of light emitting elements is configured to emit a beam of illumination light from the LIDAR device into a three dimensional environment under measurement that is parallel or nearly parallel with the axis of rotation, wherein each beam of illumination light emitted from the light emission and collection engine illuminates a different spot of a three dimensional environment with a measurement pulse of illumination light; and a plurality of light detecting elements, each corresponding to one of the plurality of light emitting elements, mounted to a second of the two or more electronics boards and configured to rotate about the axis of rotation, wherein each of the plurality of light detecting elements is configured to detect an amount of the measurement pulse reflected from each different spot of the three dimensional environment illuminated by each corresponding beam of illumination light and generates an output signal indicative of the detected amount of light; and a computing system configured to:

receive the output signal indicative of the detected amount of light;

convert the output signal to a digital signal; and determine a time of flight of the measurement pulse from the LIDAR device to the particular spot of the three dimensional environment and back to the LIDAR device based on the digital signal.

2. The LIDAR device of claim 1, further comprising: a housing fixable to an object from which LIDAR measurements are made; a stationary electronics board mechanically coupled to the housing.

3. The LIDAR device of claim 1, wherein a third of the two or more intermediate electronics boards is mechanically coupled to one or more lens elements of an illumination optics subsystem of the LIDAR device and one or more lens elements of a collection optics subsystem of the LIDAR device, wherein the third intermediate electronics board spatially separates and optically obscures the illumination optics subsystem from the collection optics subsystem.

4. The LIDAR device of claim 1, further comprising:
an illumination optics subsystem configured to collimate the beams of light emitted from the plurality of light emitting elements; and
a collection optics subsystem configured to focus the collected light onto each respective light detecting element of the plurality of light detecting elements.

5. The LIDAR device of claim 4, wherein one or more of the optical elements of the collection optics subsystem is constructed from one or more materials that absorb at least fifty percent of light outside of a predetermined wavelength range, wherein the predetermined wavelength range includes the wavelengths of light emitted by each of the plurality of light emitting elements.

6. The LIDAR device of claim 4, wherein one or more lens elements of the illumination optics subsystem are configured to flatten an intensity distribution of light emitted from each of the plurality of light emitting elements.

7. The LIDAR device of claim 6, wherein the one or more lens elements includes a diffractive optical element.

8. The LIDAR device of claim 1, further comprising:
a plurality of overmolded lenses each fixedly coupled to one of the plurality of light detecting elements.

9. The LIDAR device of claim 8, wherein one or more of the plurality of overmolded lenses is a domed lens or a compound parabolic concentrator (CPC).

10. The LIDAR device of claim 1, wherein two or more of the plurality of light emitting elements are configured to emit light simultaneously.

11. The LIDAR device of claim 1, wherein two or more of the plurality of light emitting elements are configured to emit light sequentially.

12. The LIDAR device of claim 3, wherein a first group of two or more of the plurality of light emitting elements are triggered to emit light substantially simultaneously, and, after a programmed period of time has elapsed, a second group of two or more of the plurality of light emitting elements are triggered to emit light substantially simultaneously.

13. A light emission and collection engine, comprising:
a rotating electronics board having a planar surface arranged perpendicular to an axis of rotation;
two or more intermediate electronics boards each coupled to the rotating electronics board such that a planar surface of each of the intermediate electronics boards is oriented perpendicular to the planar surface of the rotating electronics board;
a plurality of light emitting elements mounted to a first of the two more intermediate electronics boards and configured to rotate about the axis of rotation, each configured to emit a beam of illumination light at a different angle with respect to the axis of rotation, wherein at least one of the plurality of light emitting elements is configured to emit a beam of illumination light that is parallel or nearly parallel with the axis of rotation, wherein each beam of illumination light emitted from the light emission and collection engine illuminates a different spot of a three dimensional environment with a measurement pulse of illumination light;
a plurality of light detecting elements each corresponding to one of the plurality of light emitting elements, mounted to a second of the two or more intermediate electronics board and configured to rotate about the axis of rotation, wherein each of the plurality of light detecting elements is configured to detect an amount of the measurement pulse reflected from each different spot of the three dimensional environment illuminated by each corresponding beam of illumination light and generates an output signal indicative of the detected amount of light.

14. The light emission and collection engine of claim 13, wherein a third of the two or more intermediate electronics boards is mechanically coupled to one or more lens elements of an illumination optics subsystem of a light detection and ranging (LIDAR) device and one or more lens elements of a collection optics subsystem of the LIDAR device, wherein the third intermediate electronics board spatially separates and optically obscures the illumination optics subsystem from the collection optics subsystem.

15. The light emission and collection engine of claim 13, further comprising:

a collection optics subsystem configured to focus the collected light onto each respective light detecting element of the plurality of light detecting elements, wherein one or more of the optical elements of the collection optics subsystem is constructed from one or more materials that absorb at least fifty percent of light outside of a predetermined wavelength range, wherein the predetermined wavelength range includes the wavelengths of light emitted by each of the plurality of light emitting elements.

16. The light emission and collection engine of claim 13, further comprising:
an illumination optics subsystem configured to collimate the beams of light emitted from the plurality of light emitting elements, wherein one or more lens elements of the illumination optics subsystem are configured to flatten an intensity distribution of light emitted from each of the plurality of light emitting elements.

17. A method comprising:
emitting a plurality of beams of illumination light from a LIDAR device into a three dimensional environment under measurement over a range of directions, wherein the LIDAR device comprises a rotating board arranged perpendicular to an axis of rotation, two or more electronics boards each oriented perpendicular to the rotating board, a plurality of light emitting elements mounted to a first of the two or more electronics boards and configured to rotate about the axis of rotation such that the range of directions of the plurality of beams spans an angular range that includes a direction parallel to the axis of rotation of a plurality of light emitting elements of the LIDAR device, the plurality of beams of illumination light each illuminate a different spot of the three dimensional environment under measurement with a measurement pulse of illumination light, wherein the LIDAR device further comprises a plurality of light detecting elements, each corresponding to one of the plurality of light emitting elements, mounted to a second of the two or more electronics board and configured to rotate about the axis of rotation;
detecting, by the plurality of light detecting elements, the plurality of measurement pulses reflected from each different spot of the three dimensional environment illuminated by the plurality of beams of illumination light;
generating a plurality of output signals each indicative of one of the plurality of reflected measurement pulses;
converting each of the plurality of output signals to a digital signal; and
determining a time of flight of each measurement pulse from the LIDAR device to each particular spot of the three dimensional environment under measurement and back to the LIDAR device based on each of the digital signals.

18. The method of claim 17, further comprising:
flattening an intensity distribution of light emitted from each of the plurality of light emitting elements.

19. The light emission and collection engine of claim 13, further comprising:
a plurality of overmolded lenses each fixedly coupled to one of the plurality of light detecting elements.

20. The light emission and collection engine of claim 19, wherein one or more of the plurality of overmolded lenses is a domed lens or a compound parabolic concentrator (CPC).

21. The light emission and collection engine of claim 13, wherein two or more of the plurality of light emitting elements are configured to emit light simultaneously.

22. The light emission and collection engine of claim 13, wherein two or more of the plurality of light emitting elements are configured to emit light sequentially.

* * * * *